Nov. 6, 1951       C. H. BRASELTON       2,573,829
STORAGE BATTERY AND PROTECTING MEANS THEREFOR
Filed May 28, 1949
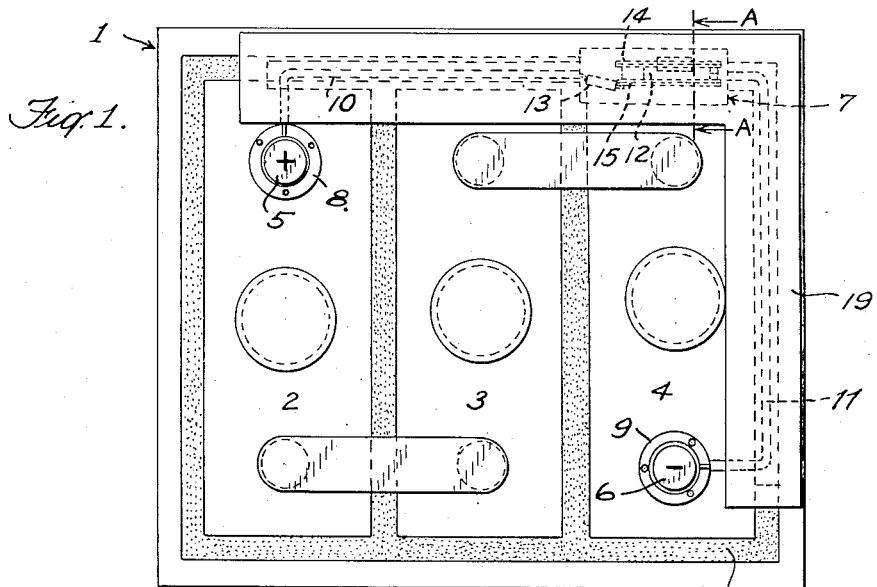
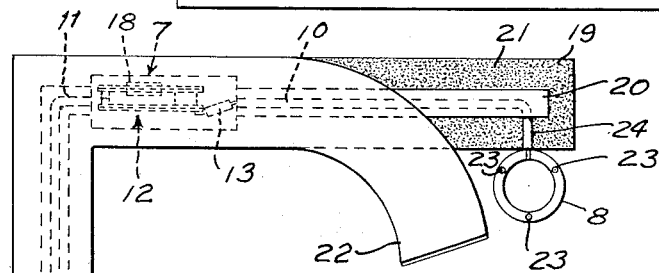
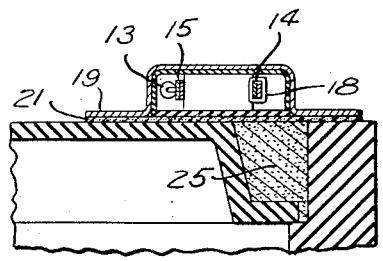
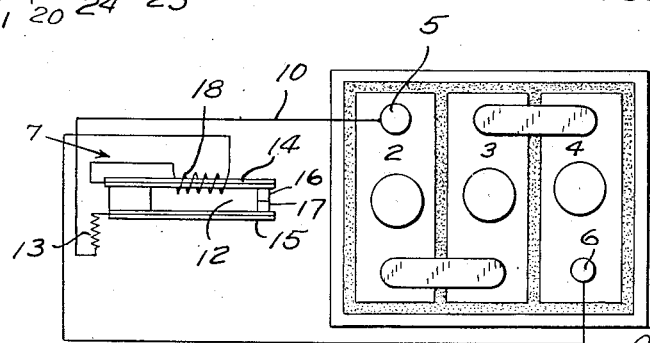
Inventor
Chester H. Braselton Patented Nov. 6, 1951

2,573,829

UNITED STATES PATENT OFFICE 2,573,829

STORAGE BATTERY AND PROTECTING
MEANS THEREFOR

Chester H. Braselton, New York, N. Y.

Application May 28, 1949, Serial No. 95,972

18 Claims. (Cl. 320—21)

The present invention relates to storage batteries and their use, and deals more directly with means for improving the operating life of storage batteries in general.

In more particularity the present invention is an improvement and modification of the general protective system described in my copending applications: Serial No. 57,596, filed October 30, 1948, entitled "Storage Batteries and Methods and Devices for Preserving Their Life," and Serial No. 71,096, filed January 15, 1949, entitled "Device for Improving the Useful Life of Storage Batteries."

As pointed out in my copending applications, in the utilization of an electrical storage battery the storage battery is usually arranged for connection to its particular electrical load circuit through a switching arrangement. In a great number of instances it is required that the battery supply energy to this load for relatively brief periods of time, and then afterward be allowed to remain idle for a relatively long period before being put to use again. During this idle time most all forms of storage batteries are subject to deleterious internal changes. The changes occurring in the battery while standing idle not only discharge the battery but in a majority of cases tend to decrease or destroy the battery's ability to be recharged to its original full capacity.

Particularly do storage cells and batteries of the lead acid type yield to a further disadvantage in that the limit of their ampere hour capacity and cell voltage is defined by the maximum permissible concentration of electrolyte. If the electrolyte density is increased in the battery or cell to provide additional ampere hour capacity, the aforementioned effects when the battery is standing idle are accelerated to cause more rapid deleterious chemical changes in the cell. All this is further accelerated when the battery is operating or standing idle under conditions of higher temperature, which materially increases local action and loss of rechargeability of the cell plates. Consequently, it has been necessary to keep specific gravity of the electrolyte sufficiently low to insure that harm does not occur to the cells when they stand idle at temperatures ofttimes encountered in battery use. This requisite lower concentration of the electrolyte normally encountered in storage cells on this account lessens the cell's immunity to freezing, which in the event of freezing, may completely disintegrate the plates and battery.

In my copending applications I have disclosed the discovery that if I keep such a storage battery in a discharging state at all times by the perpetual action of a suitable value of external load upon the battery, even though this load may draw current which is but a fraction of the equivalent current of the local action or self-discharge of the battery, such a perpetual current obviates the loss of rechargeability suffered by batteries allowed to stand idle over substantial periods. In so doing, the current, which I shall hereinafter refer to as a "protective current," causes any formed products to assume a form which allows them to be more readily transformed back to their respective plate materials through the charging process. The products formed without the use of my system not only resist being transformed back into their respective electrode materials, consequently reducing the capacity of the battery to accept charge, but also tend to expand and break off in flakes from the respective electrodes, with considerable damage to the same. Therefore, my system provides a means for substantially increasing the life of the battery without too great a reduction in its standing idle or shelf life.

In the establishment of a protective current for a storage battery, care should be exercised that sufficient current is drawn to provide sufficient protection, yet that this value of protective current is not made sufficiently great to substantially reduce the shelf life of the battery. I have found that the actual value of the protective current controls, to a large degree, the porosity of the products produced within the cell, and therefore the speed with which they may be reduced or oxidized upon attempted recharging.

In accordance with the present invention I have further found that it is sometimes desirable to increase the peak protective current load to realize certain benefits in the nature of the products formed. However, in order to prevent serious reduction in shelf life of the battery due to this increased peak protective current, I provide means for periodically interrupting the protective current flow at intervals which maintain the average protective current flow at a suitably low value.

It is therefore a purpose of the present invention to describe a method for improving an electrical storage battery by reducing the deleterious effects occurring within the cell when the cell is standing idle, and thereby permit a wider standing idle range of temperature or electrolyte concentration without adversely affecting the life or capacity of the battery.

A further object of the present invention is to provide a device for connection with a storage battery which will maintain the porosity of the storage battery plates throughout the life of the battery, thereby extending the life of the battery and improving its operating efficiency at low temperatures, as well as protecting the battery in high temperature ranges.

It is moreover a purpose of this invention to describe a method and improved device which may be applied to storage cells of present day construction which will permit an increase in ampere hour capacity of the battery to be realized by means of reducing certain deleterious effects of the increased electrolyte concentration necessary to achieve this increase in ampere hour capacity.

Another object of the present invention resides in the provision of a new and improved device for establishing a high peak, but low average value, of protective current for an electrical storage battery in accordance with the principles described at fuller length in my copending application Serial No. 57,596, above referred to.

Other objects and features of advantage of the present invention, in addition to those set forth above, will, of course, automatically suggest themselves to one skilled in the art after having benefited from the teaching of the following specification, taken in connection with the associated drawing, in which.

Fig. 1 is a top view of a conventional storage battery having attached thereto one form of the present invention.

Fig. 2 is an underside view of the battery attachment embodying the form of the present invention shown in Fig. 1.

Fig. 3 is a detailed sectional side view of the arrangement shown in Fig. 1, taken on the line A—A and looking in the direction of the arrows thereon.

Fig. 4 is a combination diagrammatic and schematic representation of the form of the present invention illustrated in Fig. 1, in its connection to the battery therein.

Referring now to Fig. 1 there is shown a typical storage battery 1 of the lead acid variety, comprising three individual storage cells 2, 3 and 4. The battery is so arranged to provide a positive output or load terminal 5 at cell 2, while the negative terminal 6 of cell 4 acts as the negative output terminal of the battery.

According to the present invention, in order to reduce the deleterious effects of "standing idle" within the individual cells, there is provided an intermittently acting load at 7 (shown in dotted lines, and described more fully hereinafter) which is connected across the battery output terminals 5 and 6 by means of terminal connectors 8 and 9 with their associated leads 10 and 11 (also shown in dotted lines).

A more detailed understanding of the actual connection of the intermittently acting load, as well as its mode of intermittent operation, may be gleaned by reference to Fig. 4. Although the actual form of the intermittent loading device is of small importance to the successful practice of the present invention, in Fig. 4 there is shown, for an example of an intermittently acting load such as 7 in Fig. 1, a bi-metallic repeating switch or relay which recurrently acts to intermittently place the load 13 across the battery terminals. The value of the resistance 13 is chosen in accordance with the general principles set forth in my copending application Serial No. 57,596, hereinabove referred to, and in practice may be such as to cause an average protective current flow ranging from less than one milliampere up to a hundred or more milliamperes, depending upon the quality, characteristics and normal operating environment of the battery itself. However, as pointed out above, it has been found that in some instances it is beneficial to establish the desired average current by repeated "bursts" or rather short periods of relatively high discharge currents. Correspondingly, the actual value of the resistance 13 will, in fact, become a function of the character of the cyclic rate at which it is interposed across the battery.

In accordance with the particular arrangement shown more clearly in Fig. 4, the bi-metallic relay 12 comprises two bi-metallic armatures 14 and 15, spaced relative to one another such that the contacts 16 and 17 are normally closed. Around one of the bi-metallic armatures, such as 14, there is wound a heating coil 18, which is connected in series with the load resistance 13, through the contacts 16 and 17.

The two bi-metallic armatures are preferably balanced in nature so that the tension between the contacts 16 and 17 remain virtually constant for most all reasonable changes in ambient temperature. Therefore, with the connections shown, the protective current flow through the resistance 13 will cause the heating element 18 to heat only the bi-metallic armature 14, which is so arranged to move away from the armature 15 in response to heat. The protective current will then be interrupted due to the parting of contacts 16 and 17, and the armature 13 will then proceed to cool. After cooling sufficiently, the contacts 16 and 17 will again close and establish a protective load current through resistance 13 and coil 18 Obviously the cycle will continue to repeat itself at some rate which is determined by the characteristics of the bi-metallic relay itself and the rate at which it is allowed to cool.

For instance, in the case of a hundred ampere hour lead acid storage battery of conventional design, it may be desired to establish an average protective current of, for example, 5 milliamperes. Assuming then that the bi-metallic relay acts to cyclically apply the load 13 across the battery terminals for periods which are, but again for example, only ten percent of the open or break time of the relay, the necessary peak current would then be ten times the required 5 milliamperes, e. g. 50 milliamperes. Of course if the make and break intervals of the relay assumed a different operating ratio, a suitable change in the peak current (and load 13) would have to be made to yield the average of only 5 milliamperes. Other average protective currents for the 100 ampere hour battery may be desired. Accordingly, for a given size of load resistance 13, the make and break periods of the relay could, generally, be adjusted to establish this different value of average current.

Although the actual location of the load interrupting mechanism is not critical in the successful utilization of the present invention, there is shown, in Fig. 2 and Fig. 3, one very compact and convenient way of arranging the elements of Fig. 4. The bi-metallic relay 12, with the associated load resistance 13, is housed in a protective cover 7 (shown in dotted lines) which, as a complete unit, is hereinabove referred to as the intermittently acting load. The protective cover 7 has extending therefrom the two connecting leads 10 and 11 which respectively terminate in the connectors 8 and 9. As shown in more particularity in Fig. 2, the leads 10 and 11 are protected and insulated between two pieces of sheet insulating material such as 19 and 20. The two contacting surfaces of the sheets may be gummed, or adhesive in nature, and thereby themselves hold the connectors 10 and 11 to the main sheet or strip 19. In a preferred embodiment of the type shown in Fig. 2, it is generally desirable to provide some adhesive substance 21 to the surface of the sheet 19 so that this sheet or strip may be easily fastened and held to the top surface of the battery as shown in Fig. 1. In order to protect the adhesive 21 before applying the sheet to any surface, a protective sheet 22 may be employed. Obviously, then, just prior to installing the intermittent load to the battery, the protective sheet 22 would be removed. In practice I prefer to make the sheets 19 and element 20 of acid resistant material such as, for example, plastic tape or plastic cloth.

The extremities of the leads 10 and 11, as stated above, are equipped with connectors 8 and 9, which have extending from their periphery a plurality of sharply pointed contactors 23. These connectors, with the needle-like contactors, are placed point down over the respective battery terminals 5 and 6. The sharp points of the contactors then dig into the lead hub (not shown) at the base of the battery terminals 5 and 6, and insure a perfect electrical contact at all times. As indicated, a suitable insulation 24, around the leads 10 and 11, is brought up just to where the leads are fastened to the connectors, thereby providing extra protection for leads from battery acid and other deleterious influences.

It will be noticed that the complete assembly comprising the bi-metallic relay and load is physically arranged to permit fastening of it to the battery top along the outside edge, and in part, over the sealing compound 25, indicated in Figs. 1 and 3. This arrangement is useful in another respect in that it tends to cover any cracks that might occur in the sealing compound with aging of the battery. More specific details of the adhesive protective sheet arrangement, as well as the spiked connectors themselves, are shown in my copending U. S. patent application, hereinabove referred to, entitled "Device for Improving the Useful Life of Storage Batteries," Serial No. 71,096, filed January 15, 1949.

It will be apparent from an understanding of the present invention that its value is in no way limited to the specific details of the illustrative diagrams shown above. For instance, the bi-metallic relay heating element 18, Fig. 4, may be made of such resistance that it, in itself, supplies the proper intermittent load across the battery, this, of course, making unnecessary the provision of the separate load resistance 13. Moreover, the bi-metallic interrupter relay 12, Fig. 4 is exemplary, in the combination or system there shown, of any conventional or special intermittent make and break device employable to serve its purpose in the combination, various such devices being known, per se, to the prior art. Furthermore, although it is found to be rather convenient to place the interrupter relay and load near the battery itself, it is manifest that the beneficial effects of the intermittent protective load can be realized by placing the loading mechanism at a point remote from the battery and supplying suitable connecting wires, as exemplified diagrammatically by the leads 10 and 11 in Fig. 4.

As may be seen from the foregoing, the use of my invention establishes an average current flow through the battery which results in formation of fine sulphate crystals in the plates, and reduction of tendency of the electrolyte to supersaturate with reduction in temperature. While the reason for loss of rechargeability on standing idle is not fully understood, this seems to be due in part to growth of large dense sulfate crystals at the expense of small porous ones. Whatever the reason, the application of the protective current has been found by comparative experiments to materially reduce the loss of rechargeability when standing idle. The intermittent nature of the protective current flow permits the realization of advantages associated with a high peak protective current, while maintaining the average protective current drain from the battery at a relatively low figure.

Having thus described my invention, what I claim is:

1. A system of the type comprising a storage cell subjected to long idle periods, having in combination therewith protective load means for increasing the usefully rechargeable life of the cell, particularly characterized in that said means comprising a fixed protective load, and means operative to intermittently apply said load across the cell when the cell is not otherwise receiving or imparting energy, said load being of such value that the average current drain therethrough does not materially reduce the shelf-life of the cell.

2. Apparatus according to claim 1 wherein said means for supplementing the local action losses of a storage battery through an intermittently applied fixed external load comprises a bi-metallic relay having at least two contacts and a heating coil, and connections placing said heating coil in shunt with said battery terminals through two contacts of said relay.

3. A method for reducing the loss of rechargeability of a storage cell subjected to long idle periods which comprises the drawing of a protective current therefrom during such idle periods, particularly characterized in that the protective current drawn from the cell is fixed at a value which is sufficiently great to materially reduce the shelf life of the cell if continuously drawn, and in which the drawing of said protective current is interrupted at a rate which reduces the average value of current drawn to a value not materially reducing the shelf life of the cell.

4. A method for reducing the loss of rechargeability of a storage cell subjected to long idle periods which comprises the drawing of a protective current therefrom during such idle periods, particularly characterized in that the protective current drawn from the cell is fixed at a value which is sufficiently great to materially reduce the shelf life of the cell if continuously drawn, and in which the drawing of said protective current is cyclically established and interrupted at a rate which is relatively rapid and reduces the average value of current drawn to a value not materially reducing the shelf life of the cell.

5. In combination, a storage cell; a primary load circuit for said storage cell; means whereby the storage cell may be selectively connected to said primary load circuit and a secondary load circuit disposed for connection across said storage cell when said primary load circuit is disconnected from said storage cell, said secondary load circuit being so proportioned to cause a protective current to flow through said cell when said primary load circuit is disconnected in order to reduce the deleterious effects of internal actions which take place while the cell is standing idle; and means responsive to said secondary load circuit for periodically interrupting the application of said secondary load circuit to said storage cell in order to reduce the average protective current drain therefrom, but realize the benefits of the high peak protective current established by said secondary circuit when connected to said cell.

6. A method of reducing the formation of prejudicial conglomerations of internal local action and self-discharge products in a storage cell by cyclically supplementing normal self discharge formations of cell products by continuous cyclic discharge of the cell.

7. An article of manufacture suitable for establishing an intermittent protective load current through a storage battery having positive and negative terminals, each terminal having a circular cross section, said article comprising, in combination, a self-interrupting load comprising a resistance and current energized means for interrupting the circuit therethrough at a predetermined rate, a first and second conductor from the extremities of said load, a thin annular ring made of conductive material physically and electrically fastened to one end of each of said first and second conductors, a pointed electrical protuberance extending from one face of each annular ring, the diameters of the annular ring holes being such to snugly surround the positive and negative posts of said battery at their base such to allow the pointed protuberances on said annular rings to imbed and electrically contact the terminal post material and communicate said self-interrupting load to said battery.

8. An article of manufacture according to claim 7 wherein said self-interrupting load comprises a bi-metallic relay having a self-excited heating winding thereon for opening and closing the relay, and a load resistance connected through said relay and in series with said heating coil.

9. An article of manufacture according to claim 7 where the first and second electrical conductor, including said load, are embraced by a first and second strip of insulating, protective material, the first strip being wider than the second strip, said first strip having a coating of adhesive material on its underside so that the first and second conductor, as well as said load, may be fixedly interposed between the first and second strips, and after interpositioning between said strips, adhesively fastened to the top of the battery case by adhesive material on the first strip, not common to said second strip.

10. An article of manufacture for attachable electrical connection between the positive and negative electrodes of a storage battery for establishing between said electrodes an intermittently acting protective discharge of predetermined peak value and predetermined average value, said article of manufacture comprising a relay having an actuating winding connected in series with a load such that the current through the load controls the actuation of the relay, and means for delaying the actuation of the relay upon passage of current through the load, a first and second terminal conductor electrically connected to the load and relay combination, and a connector fastened to the ends of the first and second terminal conductors, said connectors being adapted to electrically contact the electrodes of said battery to provide a cyclic protective load on said battery.

11. An article of manufacture for attachable electrical connection between the positive and negative electrodes of a storage battery for establishing between said electrodes an intermittently acting protective discharge of predetermined peak value and predetermined average value, said article of manufacture comprising an electrical relay having an actuating winding and a pair of normally closed contact connections placing said actuating winding in series with said contacts such that current through the actuating winding will act to open said contacts and discontinue current flowing through said actuating winding, means for delaying the actuation of the relay upon passage of current through the actuating winding, a first and second electrical conductor connected across the series combination of said actuating winding, and said pair of normally closed contacts, an electrical connector fastened to the ends of said first and second electrical conductors, said connectors being adapted to contact the terminals of said battery whereby one connector may be connected with a positive battery terminal and the other connector may be connected with a negative battery terminal to provide a cyclic protective load on said battery.

12. An article of manufacture for attachable electrical connection between the positive and negative electrodes of a storage battery for establishing between said electrodes an intermittently acting protective discharge of predetermined peak value and predetermined average value, said article of manufacture comprising a relay having an actuating winding connected in series with a load such that the current through the load controls the actuation of the relay, and means for delaying the actuation of the relay upon passage of current through the load, a first and second electrical conductor connected to the load and relay combination, a sharply pointed rigid electrically conductive connector fastened to the ends of the first and second electrical conductors, said connectors being adapted to pierce and electrically contact the electrode material of said battery when forcibly driven therein whereby one connector may be driven to the positive electrode, and the other may be driven to the negative electrode to provide a cyclic protective load on said battery.

13. An article of manufacture according to claim 7 wherein said resistor and relay and connected terminal conductors, exclusive of said piercing connectors, are covered by a strip of insulating material, said strip being adapted for adhesive coating on the underside so that said resistor, relay and terminal conductors may be adhesively maintained and protected thereunder.

14. In an electrical storage battery arrangement including a lead acid storage battery having positive and negative terminal posts extending from the battery to the terminal case, each having at their base a shoulder of conductive material surrounding its base, the combination of protective electrical load means having conductors extending from the terminals thereof, said protective load means comprising a current draining device for draining a current from the battery of a predetermined peak value and means for cyclically establishing and suspending current drain therethrough to establish a rate of current drain of such average value as to avoid excessive reduction of the shelf-life of the battery, a first and second electrically conductive insulated ring electrically connected to said conductors, the openings in said annular rings being adapted for respective conformance to and electrical contact with the positive and negative terminals of said battery at the respective conductive shoulders, and sharply pointed rigid electrical conductive protuberances electrically connected to and extending from one side of each of said annular rings for piercing electrical contact with the shoulder material of said terminal posts when embraced by said annular ring, whereby said protective load may be permanently connected between the positive and negative terminals of said battery.

15. Apparatus according to claim 14 wherein said protective load comprises a bi-metallic relay having at least two separable electrical contacts and a heating coil, and connections applying said heating coil across the battery terminals through said contacts.

16. Apparatus according to claim 14 wherein said cyclically varying load and associated terminal conductors are embraced by an acid-resistant, insulating protective material, and wherein adhesive is applied to said insulating protective material so that said adhesively protective material may be fastened to the surface of the battery case to mechanically support said self-supporting load subsequent to piercing connection of said insulated ring connectors on said battery terminal posts.

17. In a device for reducing the deleterious effects from standing idle of a storage battery, the combination of a self-interrupting electrical load including a bi-metallic thermal relay unit, adhesive means for fastening the same to the top of a storage battery cover, electrical conductors extending from the extremities of the load, and means for electrically connecting the free ends of the conductors with the terminals of a storage battery.

18. Apparatus according to claim 4 wherein said means responsive to said secondary load current for periodically interrupting the application of said secondary load circuit to said storage cell comprises a bi-metallic relay having at least two separable electrical contacts and a heating coil associated therewith, and connections applying said heating coil in series with said contacts for shunt connection across said battery.

CHESTER H. BRASELTON.

REFERENCES CITED

The following references are of record in the file of this patent:

UNITED STATES PATENTS

| Number | Name | Date |
| --- | --- | --- |
| 1,127,936 | Snyder | Feb. 9, 1915 |
| 1,393,674 | Doe | Oct. 11, 1921 |
| 1,424,731 | Linebarger | Aug. 1, 1922 |
| 1,524,642 | Stranszky | Jan. 27, 1925 |
| 1,687,230 | Smith | Oct. 9, 1928 |
| 1,846,246 | Bowditch | Feb. 23, 1932 |
| 1,905,741 | Oliver | Apr. 25, 1933 |
| 2,007,610 | Musgrave et al. | July 9, 1935 |
| 2,073,118 | Pierson | Mar. 9, 1937 |
| 2,085,598 | Oppenheim | June 29, 1937 |
| 2,457,616 | Van Dyke et al. | Dec. 28, 1948 |

FOREIGN PATENTS

| Number | Country | Date |
| --- | --- | --- |
| 13,125 of 1933 | Australia | June 20, 1933 |
| 51,347 | Denmark | Feb. 21, 1936 |

OTHER REFERENCES

Vinal Storage Batteries, 3rd ed., 1940, pages 215, 254, 307 to 310.

Modern Plastics, February 1944, page 114.

Batteries and Their Care (Perkins), March 1, 1934, pages 5 and 19 (Rejuvenator).